(12) United States Patent
Wadehn et al.

(10) Patent No.: US 10,005,305 B2
(45) Date of Patent: Jun. 26, 2018

(54) MARKING A WORKPIECE WITH A DATA MATRIX CODE BY MEANS OF A LASER BEAM

(71) Applicant: TRUMPF Werkzeugmaschinen GmbH + Co. KG, Ditzingen (DE)

(72) Inventors: Wolf Wadehn, Farmington, CT (US);
Korbinian Weiss, Stuttgart (DE);
Markus Zimmermann,
Leinfelden-Echterdingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 73 days.

(21) Appl. No.: 15/367,410

(22) Filed: Dec. 2, 2016

(65) Prior Publication Data

US 2017/0080734 A1 Mar. 23, 2017

Related U.S. Application Data

(63) Continuation of application No. PCT/EP2015/061982, filed on May 29, 2015.

(30) Foreign Application Priority Data

Jun. 4, 2014 (DE) .................. 10 2014 210 611

(51) Int. Cl.
*B41M 5/24* (2006.01)
*B23K 26/00* (2014.01)
(Continued)

(52) U.S. Cl.
CPC ........... *B41M 5/24* (2013.01); *B23K 26/0084* (2013.01); *B23K 26/0622* (2015.10); *B23K 26/0876* (2013.01); *B23K 26/361* (2015.10)

(58) Field of Classification Search
CPC .... B41M 5/24; B23K 26/361; B23K 26/0876; B23K 26/0622; B23K 26/0084
See application file for complete search history.

(56) References Cited

U.S. PATENT DOCUMENTS 6,121,574 A * 9/2000 Xu .................. G06K 15/029
219/121.69
6,423,935 B1 7/2002 Hackel et al.
(Continued)

FOREIGN PATENT DOCUMENTS

CN 1223492 7/1999
CN 102096347 6/2011
(Continued)

OTHER PUBLICATIONS

International Search Report from corresponding PCT Application No. PCT/EP2015/061982, dated Oct. 26, 2015, 4 pages.
(Continued)

*Primary Examiner* — Yaovi M Ameh
(74) *Attorney, Agent, or Firm* — Fish & Richardson P.C.

(57) ABSTRACT

This disclosure relates to methods and apparatuses for marking a data matrix code in the form of an n*m cell matrix of light and dark cells, which respectively consist of a light or dark s*t pixel matrix, on a workpiece by a laser beam, wherein a laser processing unit directs the laser beam onto the workpiece, scans, pixel row by pixel row, the workpiece region to be marked, respectively with a constant marking speed and alternately in opposite directions, and wherein the light pixels and/or the dark pixels are marked on the workpiece during the scan by temporarily switching on the laser beam, wherein the laser processing unit is guided from an already scanned pixel row along a curve having a diameter of which is at least two times the pixel row spacing, to the next pixel row to be scanned.

13 Claims, 3 Drawing Sheets

(51) Int. Cl.
*B23K 26/08* (2014.01)
*B23K 26/0622* (2014.01)
*B23K 26/361* (2014.01)

(56) References Cited

U.S. PATENT DOCUMENTS

| | | |
|---|---|---|
| 2006/0194205 A1 | 8/2006 | Pouteau et al. |
| 2010/0099239 A1* | 4/2010 | Dunne ............... B23K 26/0075 438/463 |
| 2010/0155381 A1 | 6/2010 | Kuhl et al. |
| 2013/0169732 A1* | 7/2013 | Witzmann ............. B41M 5/262 347/225 |
| 2015/0258632 A1 | 9/2015 | Pluess et al. |

FOREIGN PATENT DOCUMENTS

| | | |
|---|---|---|
| CN | 103080948 | 5/2013 |
| DE | 3713502 A1 | 11/1988 |
| DE | 19711243 A1 | 10/1998 |
| DE | 102007012815 A1 | 9/2008 |
| DE | 102008028776 A1 | 12/2009 |
| DE | 102010037273 A1 | 3/2012 |
| DE | 102012111771 A1 | 6/2014 |
| WO | WO0161619 A1 | 8/2001 |

OTHER PUBLICATIONS

Chinese Office Action in Application No. 201580029412, dated Nov. 27, 2017, 11 pages (with English translation).

\* cited by examiner

MARKING A WORKPIECE WITH A DATA MATRIX CODE BY MEANS OF A LASER BEAM

CROSS-REFERENCE TO RELATED APPLICATIONS

This application is a continuation of and claims priority under 35 U.S.C. § 120 to PCT Application No. PCT/EP2015/061982 filed on May 29, 2015, which claims priority to German Application No. 10 2014 210 611.7, filed on Jun. 4, 2014. The entire contents of these priority applications are incorporated herein by reference.

TECHNICAL FIELD

The present invention relates to methods and apparatuses for marking a data matrix code (DMC) using a laser beam.

BACKGROUND

In a DMC, information is encoded very compactly in a square or rectangular area as a pattern of light (e.g., white) and dark (e.g., black) cells, each cell being formed by a single pixel or by a pixel matrix.

In some marking methods, a DMC is applied onto a workpiece by a laser processing unit, which directs the laser beam onto the workpiece, scanning neighboring pixel rows of the DMC successively in opposite directions while marking the dark pixels on the lighter workpiece surface by temporarily switching on the laser beam. During the transition from one row to the immediately neighboring next pixel row, the laser processing unit needs to be braked almost until it is stationary for the reversal of its direction, and can then be accelerated back to the marking speed. These braking and accelerating processes, which are usually not jerk-free, at each row change cost time and lead overall to a lengthening of the marking time of the DMC.

SUMMARY

Various embodiments disclosed herein provide methods and apparatuses for marking a DMC in the form of an n*m cell matrix (n, m≥2) of light and dark cells, which respectively consist of a light or dark s*t pixel matrix (s, t≥1), on a workpiece by a laser beam.

Certain embodiments provide methods where a laser processing unit directs the laser beam onto the workpiece. The methods include scanning the laser processing unit, pixel row by pixel row, in a region on the workpiece to be marked with the laser beam, respectively at a constant marking speed (v) and alternately in opposite directions. At least one of the light pixels and the dark pixels are marked on the workpiece during the scan by temporarily switching on the laser beam. The methods include guiding the laser processing unit from a scanned pixel row along a curve. The curve has a diameter ($d_1$) that is at least two times a width of a pixel row spacing. The curve extends from the scanned pixel row from which the laser processing unit is guided to the next pixel row to be scanned.

In certain implementations, the diameter is at least 5 times the pixel row spacing. In certain implementations, the diameter is at least 10 times the pixel row spacing.

The diameter according to certain embodiments of the invention, of at least two times the pixel row spacing, make it possible for the laser processing unit to maintain a high speed during the row transition, and therefore to minimize the time of a row change. In the case of processing pixel row by pixel row with directly consecutive pixel rows, the row transition between two pixel rows is carried out via a loop-shaped curve, which, although—compared with a loop-less row transition between two directly neighboring pixel rows—represents a longer path, can nevertheless be executed with a significantly higher speed and without jerks, which results in an overall shorter marking time. In the case of processing pixel row by pixel row with pixel rows that are not directly consecutive, the row transition between two pixel rows can take place via an arc-shaped, in particular in a semicircular curve, which, although—compared with a row transition between two directly neighboring pixel rows—represents a longer path, can nevertheless be executed with a significantly higher speed and without jerks, which results in an overall shorter marking time.

In certain implementations, the laser processing unit is guided from an already scanned pixel row on a semicircular curve to the next pixel row of the cell matrix to be scanned.

In some implementations, the curve speed of the laser processing unit along the curve is at least 50% of the constant marking speed. In various implementations, the curve speed of the laser processing unit along the curve is at least 90% of the constant marking speed.

In certain implementations, the laser processing unit respectively scans the pixel rows of the cell matrix in row pairs in opposite directions, where the two rows of each of the row pairs respectively are separated from one another by more than one row spacing. In some implementations, the row pairs respectively are separated from one another by the same row spacing. It is particularly advantageous that, in the column direction, the first rows of the row pairs respectively follow one another and/or the second rows of the row pairs respectively follow one another. For example, the marking process is started in the highest pixel row of the DMC, and then a semicircle is executed to a central pixel row, which is scanned in the opposite direction. Subsequently, a semicircle is executed back to the second highest pixel row, from which the next central pixel row down is moved to via a semicircle. This rotating processing strategy continues until the last pixel row of the DMC is completed.

The pixels may respectively be marked as a point or as a line on the workpiece, a round pixel point being preferable to a pixel line, because of its better process stability in respect of material tolerance and surface quality.

The marking methods according to the invention can be implemented with beam sources in a very wide variety of power classes and all customary wavelengths, for example with solid-state lasers (wavelengths of for example from 0.5 μm 1 μm) or with $CO_2$ lasers (wavelengths of 10.6 μm).

In another embodiment, the invention also relates to a laser marking machine ("marking laser") having a laser beam generator, having a laser processing unit that can be displaced and/or tilted in the X and Y directions and directs the laser beam onto a workpiece, and having a machine controller programmed to control the movement of the laser processing unit according to methods of the invention described herein.

Lastly, particular embodiments of the invention also relates to non-transitory computer-readable storage devices storing computer executable instructions for marking a data matrix code according to embodiments described herein when the computer executable instructions are executed by a machine controller of a laser marking machine.

Further advantages and advantageous configurations of the subject-matter of the invention are prescribed by embodiments described in the detailed description, the drawings, and the claims. Likewise, the features mentioned above and those specified below can each be used independently, or several of them can be used in any desired combinations. The embodiments shown and described are not to be interpreted as an exhaustive list, but rather have an exemplary nature for description of the invention.

The details of one or more embodiments of the invention are set forth in the accompanying drawings and the description below. Other features, objects, and advantages of the invention will be apparent from the description and drawings, and from the claims.

DETAILED DESCRIPTION

In the following description of the figures, identical reference symbols are used for components which are the same or functionally equivalent.

Figure 1:
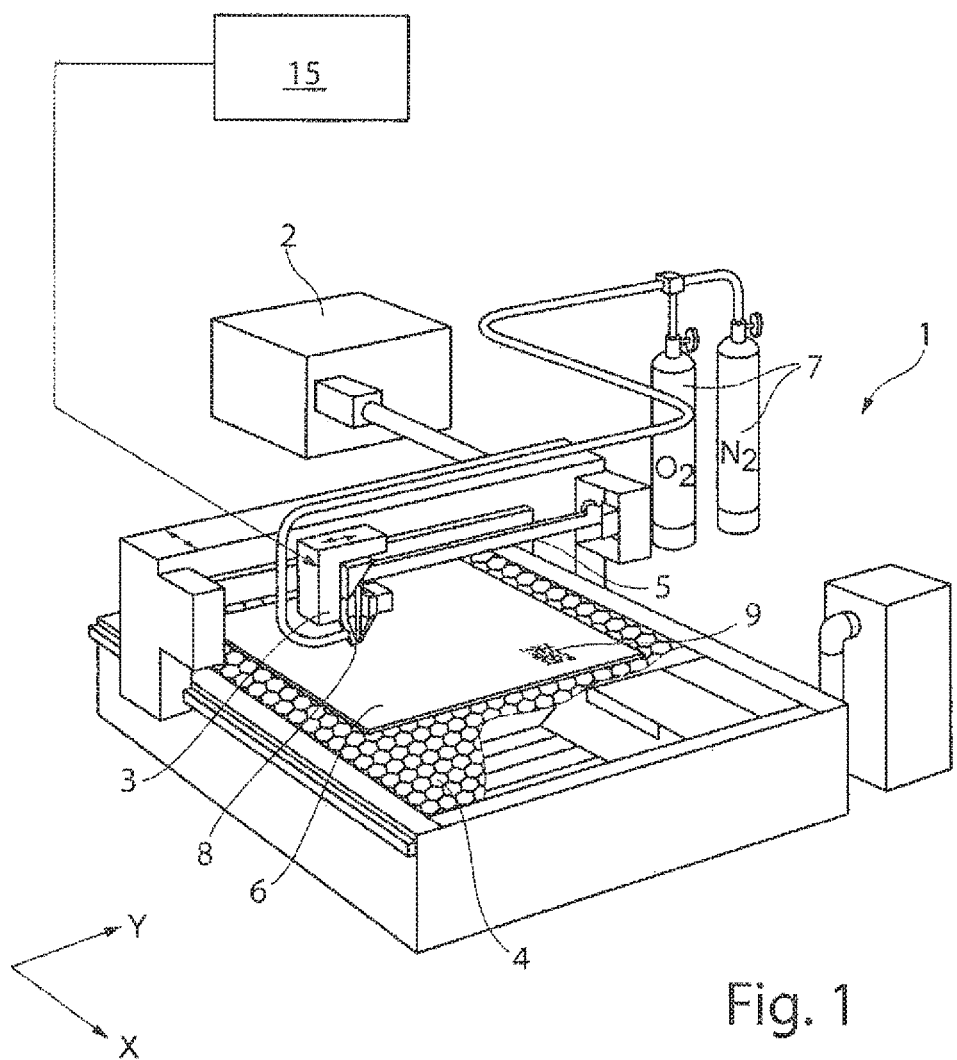
FIG. 1 shows a marking laser suitable for carrying out the marking method according to the invention.

FIG. 1 represents the marking laser 1 from a perspective view in the form of a flatbed machine. The marking laser 1 comprises a laser beam generator 2, configured, for example, as a $CO_2$ laser, a diode laser, or a solid-state laser, a laser processing unit 3 that can be displaced in the X and Y directions, and a workpiece support 4. The laser beam generator 2 generates a laser beam 5 and a light guide cable (not shown) or a deflecting mirror (not shown) guides the laser beam 5 from the laser beam generator 2 to the laser processing unit 3. Focusing optics arranged in the laser processing unit 3 direct the laser beam 5 onto a workpiece 6, which rests on the workpiece support 4. The marking laser 1 is furthermore supplied with process gases 7, for example oxygen and nitrogen. The process gas 7 is fed to a process gas nozzle 8 of the laser processing unit 3, from which it emerges together with the laser beam 5.

Figure 2:
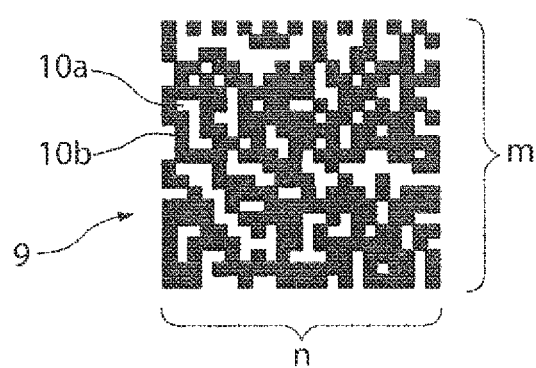
FIG. 2 shows a data matrix code using the example of a 22*22 cell matrix of light and dark pixels.

The marking laser 1 is used to apply a two-dimensional DMC 9 on the workpiece 6 by means of the laser beam 5. As shown in FIG. 2, the DMC 9 is for example an n*m cell matrix (n, m=22) of light and dark cells, in which case each cell may be formed by a single light or dark pixel or by a light or dark s*t pixel matrix (s, t≥1). Merely for the sake of simplicity, it will be assumed below that each cell is formed by a single pixel $10a$, $10b$, i.e., s, t=1.

In FIGS. 3A to 3F, method steps of the marking methods according to embodiments of the invention are shown, in which the laser processing unit 3 scans, pixel row by pixel row, the workpiece region to be marked, respectively at a constant marking speed v and alternately in opposite directions, and the dark pixels $10b$ are marked on the workpiece 6 during the scan by temporarily switching on the laser beam 5.

Figure 3A:
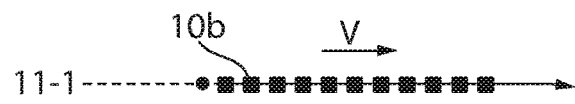
FIGS. 3A, 3B, 3C, 3D, 3E and 3F show the individual method steps of a first marking method according to the invention for applying a data matrix code onto a workpiece.

The marking process is started by the laser processing unit 3 scanning the top, $1^{st}$ pixel row 11-1 of the DMC 9 at a constant marking speed v, during which the dark pixels $10b$ are marked on the workpiece 6 by temporarily switching on the laser beam 5 (FIG. 3a).

Figure 3B:
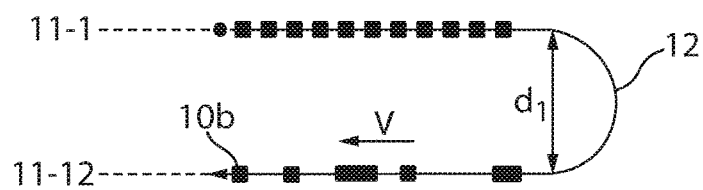

A semicircular curve 12 is then executed to the $12^{th}$ pixel row 11-12 of the DMC 9, so that the curve diameter ($d_1$) is eleven pixel row spacings (i.e., the height of eleven pixel rows). The $12^{th}$ pixel row 11-12 is scanned in the opposite direction to the $1^{st}$ pixel row 11-1 with the constant marking speed v, during which the dark pixels $10b$ are marked on the workpiece 6 by temporarily switching on the laser beam 5 (FIG. 3B).

Figure 3C:
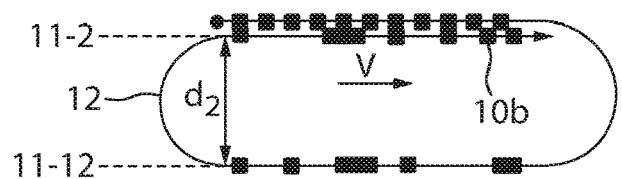

A semicircular curve 12 is then executed back to the $2^{nd}$ pixel row 11-2 of the DMC 9, so that the curve diameter ($d_2$) is now ten pixel row spacings (i.e. $d_2$ is smaller than $d_1$). The $2^{nd}$ pixel row 11-2 is scanned in the same direction as the $1^{st}$ pixel row 11-1 with the constant marking speed, during which the dark pixels $10b$ are marked on the workpiece 6 by temporarily switching on the laser beam 5 (FIG. 3C).

Figure 3D:
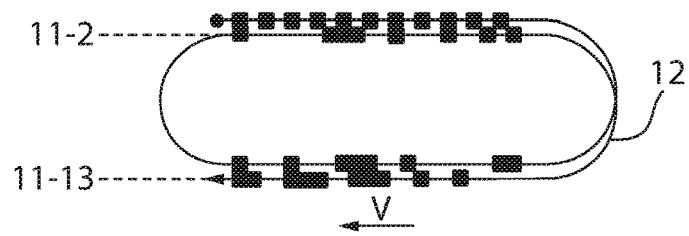

A semicircular curve 12 is then executed to the $13^{th}$ pixel row 11-13 of the DMC 9, so that the curve diameter $d_1$ is eleven pixel row spacings. The $13^{th}$ pixel row 11-13 is scanned in the same direction as the $12^{th}$ pixel row 11-12 with the constant marking speed v, during which the dark pixels $10b$ are marked on the workpiece 6 by temporarily switching on the laser beam 5 (FIG. 3D).

Figure 3E:
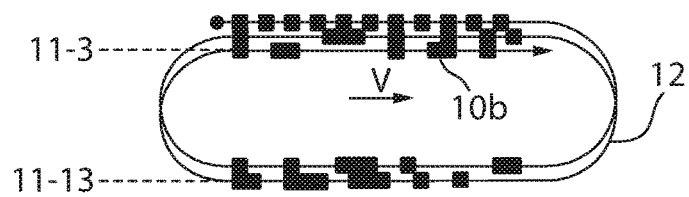

A semicircular curve 12 is then executed to the $3^{rd}$ pixel row 11-3 of the DMC 9, so that the curve diameter d is ten pixel row spacings. The $3^{rd}$ pixel row 11-3 is scanned in the same direction as the $1^{st}$ pixel row 11-1 with the constant marking speed v, during which the dark pixels $10b$ are marked on the workpiece 6 by temporarily switching on the laser beam 5 (FIG. 3E).

Figure 3F:
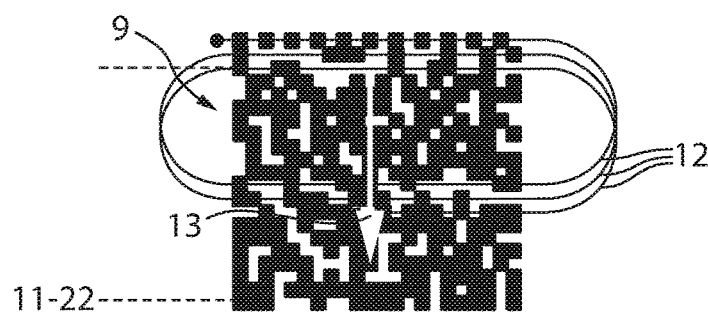

This rotating processing strategy is continued downward in the column direction 13 until the last, i.e., the bottom $22^{nd}$ pixel row 11-22 of the DMC 9 has also finally been marked (FIG. 3F).

The curve speed of the laser processing unit 3 along the semicircular curves 12 is in any event so high that—compared with narrow row transitions between two directly neighboring pixel rows—the marking time is significantly shortened despite the longer curved paths. The curve speed may, for example, be at least 50% of the constant marking speed v. The "jumping row change," or the curve diameter, need not necessarily be so great as to jump from the first pixel row to the central pixel row of the DMC 9, but rather only needs to be sufficiently large to maintain a high curve speed of the laser processing unit 3.

In FIGS. 4A to 4D, the individual method steps of a marking method according to the invention modified in relation to FIG. 3 are shown, in which the laser processing unit 3 scans, pixel row by pixel row, the workpiece region to be marked, respectively with a constant marking speed v and alternately in opposite directions, and the dark pixels $10b$ are marked on the workpiece 6 during the scan by temporarily switching on the laser beam 5.

Figure 4A:
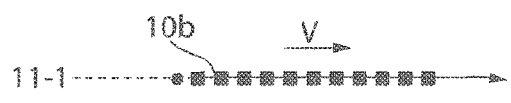
FIGS. 4A, 4B, 4C and 4D show the individual method steps of a second marking method according to the invention for applying a data matrix code onto a workpiece.

The marking process is started by the laser processing unit 3 scanning the top, $1^{st}$ pixel row 11-1 of the DMC 9 with a constant marking speed v, during which the dark pixels $10b$ are marked on the workpiece 6 by temporarily switching on the laser beam 5 (FIG. 4A).

Figure 4B:
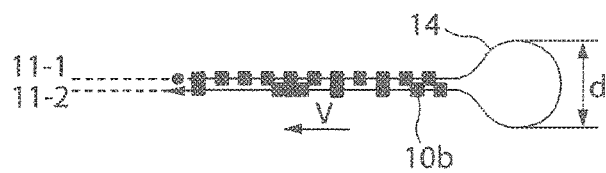

A loop-shaped curve 14 is then executed to the $2^{nd}$ pixel row 11-2 of the DMC 9, the curve diameter d being about ten pixel row spacings. The $2^{nd}$ pixel row 11-2 is scanned in the opposite direction to the $1^{st}$ pixel row 11-1 with the constant marking speed v, during which the dark pixels $10b$ are marked on the workpiece 6 by temporarily switching on the laser beam 5 (FIG. 4B).

Figure 4C:
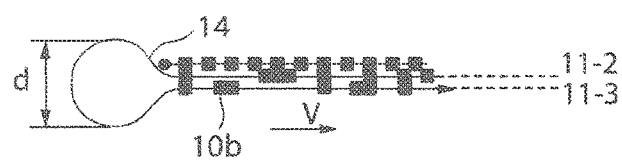

The same loop-shaped curve 14 with the same curve diameter d is then executed to the $3^{rd}$ row 11-3 of the DMC 9. The $3^{rd}$ row 11-3 is scanned in the same direction as the $1^{st}$ pixel row 11-1 with the constant marking speed v, during which the dark pixels 10b are marked on the workpiece 6 by temporarily switching on the laser beam 5 (FIG. 4C).

Figure 4D:
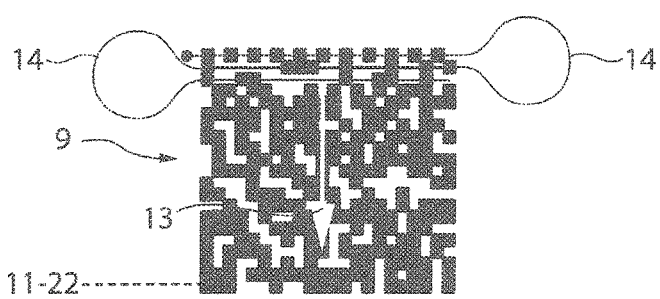

This swinging processing strategy is continued downward in the column direction 13 until the last, i.e., the bottom $22^{nd}$ pixel row 11-22 of the DMC 9 has also finally been marked (FIG. 4D).

The curve speed of the laser processing unit 3 along the loop-shaped curves 14 is in any event so high that—compared with loop-less row transitions between two directly neighboring pixels—the marking time is significantly shortened despite the longer curved paths. The "loop-shaped row change" is also possible between two pixel rows that do not directly neighbor one another, so as to execute a curve diameter greater than the row spacing.

Figures 5A, 5B:
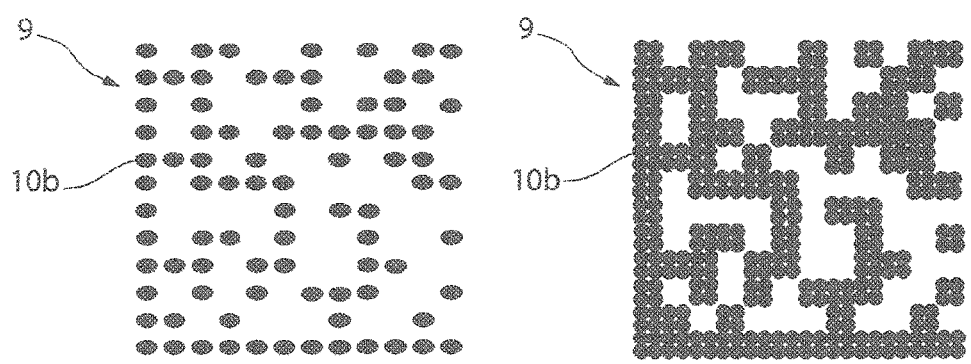
FIGS. 5A and 5B show a data matrix code consisting of pixel points (FIG. 5A) and of pixel rows (FIG. 5B).

FIG. 5A shows a data matrix code in the form of a 12*12 cell matrix 9, the dark cells of which are respectively formed by pulsed laser marking with one laser pulse each as round pixels 10b. FIG. 5B likewise shows a 12*12 cell matrix 9, the dark cells of which are respectively formed by pulsed laser marking with a plurality of laser pulses lying next to one another in a row as pixel lines 10b.

As shown in FIG. 1, the laser processing machine 1 furthermore comprises a machine controller 15, which is programmed to control the displacement movement of the laser processing unit 3 according to the marking methods described herein.

Instead of being displaceable in the X and Y directions as shown in FIG. 1, the laser processing unit 3 may also be configured to be tiltable in the X and Y directions in certain embodiments, for example by means of scanner optics that deflect the laser beam 5 in the X and Y directions.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for marking a data matrix code in the form of an n*m cell matrix of light and dark cells, which respectively consist of a light or dark s*t pixel matrix, on a workpiece by a laser beam, the method comprising:
    directing the laser beam onto the workpiece via a laser processing unit;
    scanning the laser processing unit, pixel row by pixel row, in a region on the workpiece to be marked with the laser beam, respectively at a constant marking speed and alternately in opposite directions, wherein at least one of the light pixels and the dark pixels are marked on the workpiece during the scanning by temporarily switching on the laser beam; and
    guiding the laser processing unit from a scanned pixel row along a curve, wherein the curve has a diameter ($d_1$) that is at least two times a pixel row height, and wherein the curve extends from the scanned pixel row to a next pixel row to be scanned by the laser processing unit.

2. The method of claim 1, wherein the laser processing unit is guided from the scanned pixel row on a semicircular curve to the next pixel row of the cell matrix to be scanned.

3. The method of claim 1, wherein guiding the laser processing unit from the scanned pixel row along the curve comprises guiding the laser processing unit from the scanned pixel row to the curve in a first direction and guiding the laser processing unit from the curve to the next pixel row of the cell matrix in a second direction opposite the first direction.

4. The method of claim 3, further comprising scanning the next pixel row with the laser processing unit and guiding the laser processing unit along a successive curve to a successive next pixel row of the cell matrix to be scanned,
    wherein the successive curve has a diameter ($d_2$) that is at least two times the pixel row height, but less than $d_1$,
    wherein guiding the laser processing unit from the scanned next pixel row to the successive curve to the successive next pixel row comprises guiding the laser processing unit from the scanned next pixel row to the successive curve in the second direction and guiding the laser processing unit from the successive curve to the successive next pixel row in the first direction, and
    wherein the successive next pixel row is positioned between the scanned pixel row and the scanned next pixel row.

5. The method of claim 1, wherein a curve speed of the laser processing unit along the curve is at least 50% of the constant marking speed.

6. The method of claim 1, wherein the curve speed of the laser processing unit along the curve is at least 90% of the constant marking speed.

7. The method of claim 1, wherein the laser beam is moved from the scanned pixel row to a pixel row of the cell matrix positioned more than one pixel row spacing away.

8. The method of claim 1, wherein the laser processing unit respectively scans the pixel rows of the cell matrix in row pairs in opposite directions, and wherein two rows of each of the row pairs, respectively, are separated from one another by more than one row spacing.

9. The method of claim 8, wherein the more than one row spacing separating the two rows of each of the row pairs is the same row spacing for each row pair.

10. The method of claim 8, wherein in a column direction, a first row of the row pairs respectively follow one another and/or a second row of the row pairs respectively follow one another.

11. The method of claim 1, wherein the pixels are respectively marked as a point or as a line on the workpiece.

12. A laser marking machine comprising:
    a laser beam generator, having a laser processing unit configured to be displaced and/or tilted in the X and Y directions and configured to direct a laser beam onto a workpiece for marking a data matrix code in the form of an n*m cell matrix of light and dark cells, which respectively consist of a light or dark s*t pixel matrix, on the workpiece; and
    a machine controller programmed to control the movement of the laser processing unit such that the laser guide:
        directs the laser beam onto the workpiece,
        scans, pixel row by pixel row, in a region on the workpiece to be marked with the laser beam, respectively, at a constant marking speed and alternately in opposite directions, wherein at least one of the light pixels and the dark pixels are marked on the workpiece during the scan by temporarily switching on the laser beam, and
        moves from a scanned pixel row along a curve, wherein the curve has a diameter that is at least two times a pixel row height, and wherein the curve extends from the scanned pixel row to a next pixel row to be scanned by the laser processing unit.

13. A non-transitory computer-readable storage device storing computer executable instructions for marking a data matrix code in the form of an n*m cell matrix of light and dark cells, which respectively consist of a light or dark s*t pixel matrix, on a workpiece by a laser beam, which if executed by a machine controller of a laser marking machine causes the machine controller to:

direct the laser beam onto the workpiece via a laser processing unit;

scan the laser processing unit, pixel row by pixel row, in a region on the workpiece to be marked with the laser beam, respectively at a constant marking speed and alternately in opposite directions, wherein at least one of the light pixels and the dark pixels are marked on the workpiece during the scan by temporarily switching on the laser beam; and guide the laser processing unit from a scanned pixel row along a curve, wherein the curve has a diameter that is at least two times a pixel row height, and wherein the curve extends from the scanned pixel row to a next pixel row to be scanned by the laser processing unit.

* * * * *